(12) United States Patent
Langseth et al.

(10) Patent No.: US 11,500,158 B2
(45) Date of Patent: Nov. 15, 2022

(54) FABRICATION METHOD FOR ENDCAPPED FIBER LASER PIGTAILS WITH SUB-MICRON VIRTUAL WAIST POSITIONAL ACCURACY

(71) Applicant: Massachusetts Institute of Technology, Cambridge, MA (US)

(72) Inventors: Jason E. Langseth, Malden, MA (US); Christopher Hwang, Watertown, MA (US); William Nowak, West Roxbury, MA (US); Daniel Miller, Cambridge, MA (US); David Fouche, Carlisle, MA (US); Joshua Olitzky, Windham, NH (US)

(73) Assignee: Massachusetts Institute of Technology, Cambridge, MA (US)

( * ) Notice: Subject to any disclaimer, the term of this patent is extended or adjusted under 35 U.S.C. 154(b) by 346 days.

(21) Appl. No.: 16/740,589

(22) Filed: Jan. 13, 2020

(65) Prior Publication Data
US 2020/0292756 A1 Sep. 17, 2020

Related U.S. Application Data

(60) Provisional application No. 62/817,612, filed on Mar. 13, 2019.

(51) Int. Cl.
*G02B 6/255* (2006.01)
*G02B 6/42* (2006.01)
(Continued)

(52) U.S. Cl.
CPC ......... *G02B 6/2556* (2013.01); *G01M 11/338* (2013.01); *G02B 6/2551* (2013.01);
(Continued)

(58) Field of Classification Search
CPC .................................................. G02B 6/4227
See application file for complete search history.

(56) References Cited

U.S. PATENT DOCUMENTS

| | | | |
|---|---|---|---|
| 4,744,619 A * | 5/1988 | Cameron | G02B 6/4239 385/52 |
| 5,159,653 A | 10/1992 | Carpenter et al. | |

(Continued)

OTHER PUBLICATIONS

International Search Report and Written Opinion in International Patent Application No. PCT/US2020/013321 dated Jun. 2, 2020, 16 pages.

*Primary Examiner* — Omar R Rojas
(74) *Attorney, Agent, or Firm* — Smith Baluch LLP (57) ABSTRACT

Arrays of fiber pigtails can be used to project and receive light. Unfortunately, most fiber pigtail arrays are not aligned well enough for coherently combining different optical beams. This imprecision stems in part from misalignment between the optical fiber and the endcap spliced to the end of the optical fiber. The endcap is often polished, curved, or patterned, causing the light emitted by the endcapped fiber to refract or diffract as it exits the endcap. This refraction or diffraction shifts the apparent position of the beam waist from its actual position. Measuring this virtual beam waist position before and after splicing the endcap to the fiber increases the absolute precision with which the fiber is aligned to the endcap. This increase in absolute precision reduces the deviation in virtual beam waist position among endcapped fibers, making it easier to produce arrays of endcapped fibers aligned precisely enough for coherent beam combining.

20 Claims, 8 Drawing Sheets

(51) Int. Cl.
*G01M 11/00* (2006.01)
*G02B 6/26* (2006.01)

(52) U.S. Cl.
CPC ........... *G02B 6/262* (2013.01); *G02B 6/4227* (2013.01); *G02B 6/4285* (2013.01)

(56) References Cited

U.S. PATENT DOCUMENTS

| | | |
|---|---|---|
| 5,751,871 A | 5/1998 | Krivoshlykov et al. |
| 9,250,390 B2 | 2/2016 | Muendel et al. |
| 9,817,187 B2 * | 11/2017 | Mizushima .......... G02B 6/2551 |
| 2010/0315643 A1 | 12/2010 | Kashiwagi et al. |
| 2011/0032602 A1 | 2/2011 | Rothenberg |

* cited by examiner

FABRICATION METHOD FOR ENDCAPPED FIBER LASER PIGTAILS WITH SUB-MICRON VIRTUAL WAIST POSITIONAL ACCURACY

CROSS-REFERENCE TO RELATED APPLICATION(S)

This application claims the priority benefit, under 35 U.S.C. 119(e), of U.S. Application No. 62/817,612, filed Mar. 13, 2019, which is incorporated herein by reference in its entirety.

GOVERNMENT SUPPORT

This invention was made with Government support under Grant No. FA8702-15-D-0001 awarded by the U.S. Air Force. The Government has certain rights in the invention.

BACKGROUND

A fiber pigtail is a short piece of optical fiber with an optical connector or endcap on one end and a length of exposed fiber at the other end. Fiber pigtails can be used to connect fiber-coupled components. They can also be arranged in arrays for coherent beam combining and other applications.

There are several methods used to manufacture fiber pigtails with endcaps, or endcapped fibers, for use in fiber arrays for coherent beam combining. For instance, it is possible to manufacture individual fiber holders, and position them with proper optomechanics. This typically results in a large pitch (fiber-to-fiber distance) array and typically increases the size and weight of the coherently combined optical system. The degrees of freedom in the optomechanics also provide for the possibility of positional drift given temperature changes, shock, and vibration.

A fiber array can also be made by bundling an (hexagonally close-packed) array of fibers into a capillary tube and collapsing the tube around the fibers. In this type of fiber array, the alignment of the fibers is determined entirely by the tolerance on the fiber cladding diameter and on the core-clad concentricity. For coherent combining applications, this alignment is typically not adequate.

SUMMARY

The technology disclosed here provides a fiber-coupled light source (an endcapped fiber pigtail or endcapped fiber) with sub-micron positional accuracy, when referenced to and registered against an appropriately designed mechanical fixture. It can be used to make an array of fiber-coupled light sources or receivers with sub-micron positional accuracy across the array, given an appropriately manufactured mechanical fixture to hold the light sources or receivers. These arrays of endcapped fibers are useful in coherently combining beams from different lasers or light from receive apertures.

Like fiber arrays made by bundling fibers in a capillary tube, the inventive endcapped fiber pigtails are rugged. But unlike in a bundled fiber array, if a single endcapped fiber pigtail in an array of endcapped fibers fails, it can be replaced because all of the endcapped fiber pigtails in the fiber array are made with excellent repeatability when registered against an appropriate mechanical fixture. This means that mechanical or optical failure of an endcapped fiber pigtail in an array made of endcapped fiber pigtails won't necessarily result in an unusable channel. As a result, the ruggedness of the overall optical component depends on the engineering of the mechanical fixture, not a single splice or fiber.

Endcapped fiber pigtails are particularly useful in fiber arrays for coherent beam combining and optical phased arrays. Optical phased arrays with endcapped fibers have defense applications and applications in the commercial sector, including commercial LIDAR and fine pointing control in laser communications systems over long distances. The methods for splicing a fiber to an endcap with high positional accuracy are also useful in integrated photonics applications, including in telecommunications and bio-optics. Fiber-to-chip coupling is a continuing challenge for these applications as power levels increase and the variety of wavelengths, waveguide designs, and mode sizes and shapes increases.

An endcapped fiber can be made by aligning an optical fiber to an endcap, then transmitting light through the optical fiber and the endcap. A lens or other optical element focuses the light emitted by the endcap to a near-field plane, where a camera, beam profilometer, or other image sensor measures an intensity distribution of the light in the near-field plane. The alignment of the optical fiber can be adjusted with respect to the endcap based on the intensity distribution before the optical fiber is spliced to the endcap to form the endcapped fiber.

Aligning the optical fiber to the endcap may include registering the endcap to a vee groove. The light transmitted through the optical fiber and the endcap may have a bandwidth of at least 10 nm. Measuring the intensity distribution of the light in the near-field plane may include comparing the intensity distribution to a reference intensity distribution. Adjusting the alignment of the optical fiber with respect to the endcap may include translating the optical fiber with respect to the endcap in a direction orthogonal to an optical axis of the optical fiber and/or placing a virtual waist of the endcapped fiber to within 200 nanometers of a desired position of the virtual waist.

The endcapped fiber can be placed in a vee groove array and aligned with respect to another endcapped fiber in the vee groove array. For example, the endcapped fiber may be rotated until its virtual waist position is aligned to a virtual waist position of the other endcapped fiber. If a break is detected in the endcapped fiber in the vee groove array, the endcapped fiber in the vee groove array can be replaced with another endcapped fiber.

If desired, a camera, beam profilometer, or other sensor can measure a near-field intensity distribution of light emitted from the endcapped fiber. This near-field intensity distribution can be compared to a reference near-field intensity distribution. Similarly, another sensor can measure a far-field intensity distribution of light emitted from the endcapped fiber. This far-field intensity distribution can be compared to a reference far-field intensity distribution.

Another method of making an endcapped fiber from an optical fiber and an end cap includes aligning the optical fiber to the endcap, measuring a near-field intensity distribution of light transmitted through the optical fiber and the endcap, and adjusting a position of a virtual waist of the endcap and the optical fiber based on the near-field intensity distribution. Once the virtual position has been adjusted, the optical fiber is spliced to the endcap. A camera or other sensor measures a near-field intensity distribution of light emitted from the endcapped fiber, and this near-field intensity distribution is compared to a reference near-field intensity distribution. If desired, another camera or sensor measures a far-field intensity distribution of light emitted from the endcapped fiber for comparison with a reference far-field intensity distribution. In some cases, the endcap is a first endcap, the optical fiber is a first optical fiber, and the endcapped fiber is a first endcapped fiber, and the process is repeated with a second endcap and second optical fiber to make a second endcapped fiber.

The inventive techniques also include a method of registering a first endcapped fiber to a reference endcapped fiber. This method includes measuring a first near-field intensity distribution of light transmitted through the first endcapped fiber, measuring a reference near-field intensity distribution of light transmitted through the reference endcapped fiber, and performing a comparison of the first near-field intensity distribution to the reference near-field intensity distribution. Similarly, this registration process may include measuring a first far-field intensity distribution of light transmitted through the first endcapped fiber, measuring a reference far-field intensity distribution of light transmitted through the reference endcapped fiber, and performing a comparison of the first far-field intensity distribution to the reference far-field intensity distribution.

If desired, registration can be extended to a second endcapped fiber by measuring a second near-field intensity distribution of light transmitted through the second endcapped fiber and performing a comparison of the second near-field intensity distribution to the reference near-field intensity distribution. The first and second endcapped fibers can be aligned to a vee-groove array based on the comparison of the first near-field intensity distribution to the reference near-field intensity distribution and the comparison of the second near-field intensity distribution to the reference near-field intensity distribution. Aligning the first and second endcapped fibers to the vee-groove array may include selecting a first vee-groove in the vee-groove array for the first endcapped fiber based on the comparison of the first near-field intensity distribution to the reference near-field intensity distribution and selecting a second vee-groove in the vee-groove array for the second endcapped fiber based on the comparison of the second near-field intensity distribution to the reference near-field intensity distribution.

All combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. The terminology explicitly employed herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Consider a high power optical fiber laser or amplifier. In order to increase the optical damage threshold at the exit of the optical fiber, an appropriately sized and shaped piece of glass is typically aligned and fusion-spliced to the exit pigtail, which is a piece of cleaved fiber. This piece of glass is called an endcap. The end of the endcap not spliced to fiber may be faceted or antireflection-coated to prevent back-reflections, curved to focus or collimate the emitted light, or patterned to diffract light.

Figure 1:
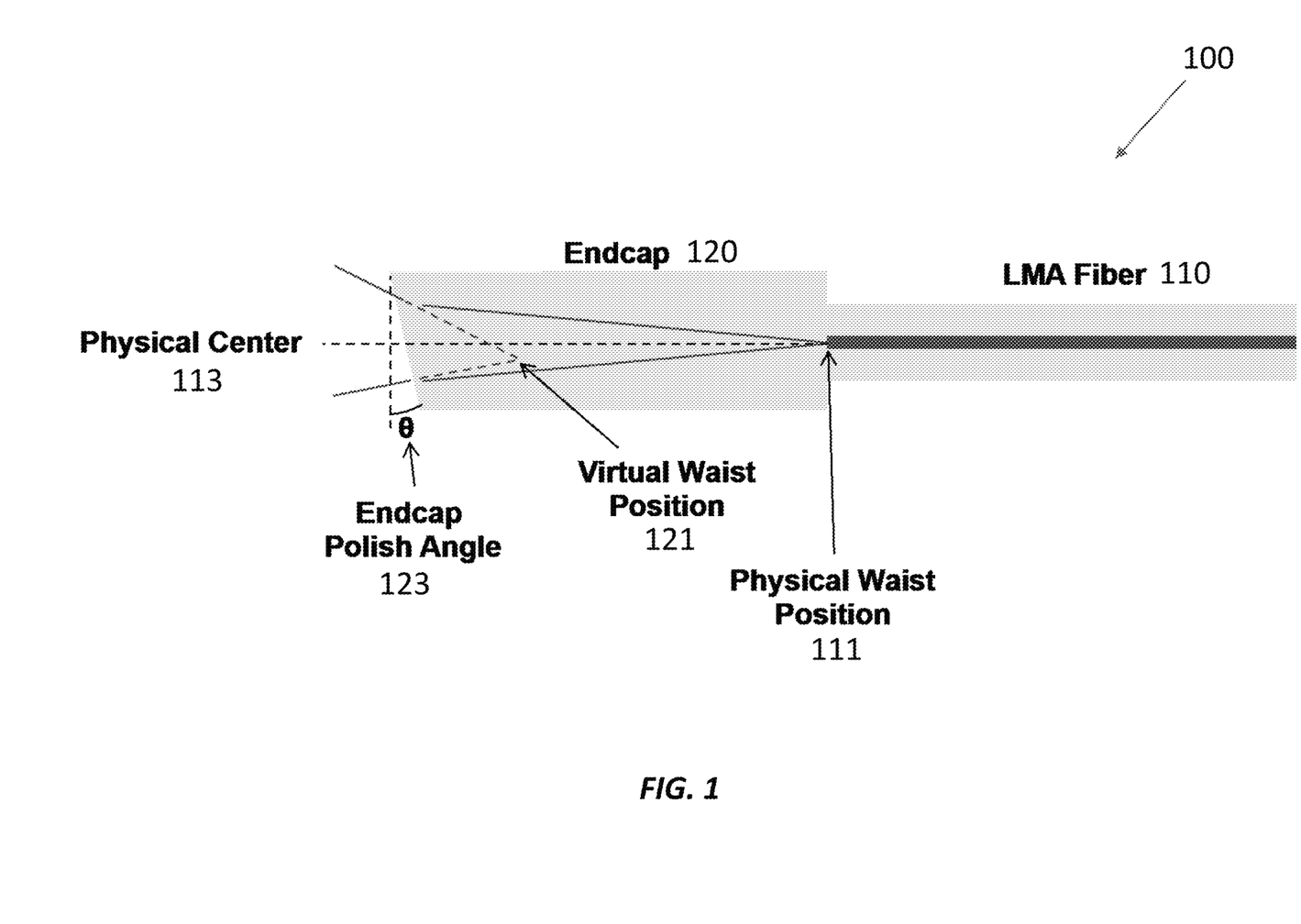
FIG. 1 shows a fiber laser endcap spliced to a large mode area (LMA) fiber pigtail to form an endcapped fiber pigtail.

FIG. 1 shows a schematic of an endcapped fiber amplifier pigtail 100 made from a large mode area (LMA) optical fiber 110 and a faceted endcap 120. It also shows the actual waist position 111 and virtual waist position 121 of a beam emitted by the endcapped fiber amplifier pigtail 100. The actual waist position 111 is the physical location of the beam waist, which is typically at the interface between the core of the fiber 110 and the endcap 120. The virtual waist position 121 is the apparent position of the beam waist as seen from outside the endcap 120, ignoring the effects of refraction at the air/endcap interface. (Put differently, the virtual waist position 121 is the position of notional point source that emits the same beam as the endcapped fiber 100.) The deviation between the actual waist position 111 and virtual waist position 121 is due to refraction from the endcap 120 into the surrounding medium (air) as explained below.

To understand this deviation, consider the endcap 120 on the LMA fiber 110. Assume negligible higher-order mode (HOM) content in the LMA fiber 110, i.e., all of the light is propagating in the fundamental transverse mode of the LMA fiber 110. Assume further that the LMA fiber 110 is prepared with a perfectly perpendicular cleave, and the endcap 120 is polished or cleaved at the splicing end with a perfectly perpendicular facet. Even if the LMA fiber 110 is spliced perfectly to the physical (geometric) center 127 of the endcap 120, the endcap's output polish angle 123 alters, via Snell's law, both the far-field propagation angle and the virtual waist position 121 in the direction transverse to beam propagation.

Imperfect cleaving, splicing, or polishing changes the virtual waist beam position 121. For example, if the LMA fiber 110 and/or the endcap 120 have cleaved faces that are not perfectly perpendicular, if they are misaligned, or if the endcap facet is not polished at the desired angle 123, the virtual waist position 121 may shift back and forth or up and down. This undesired variation in virtual waist position 121 can make it difficult to align endcapped fibers 100 with respect to each other, e.g., in a fiber array like the one shown in FIG. 6 for coherent beam combining or beam steering.

Endcap Installation Procedures

Figure 2A:
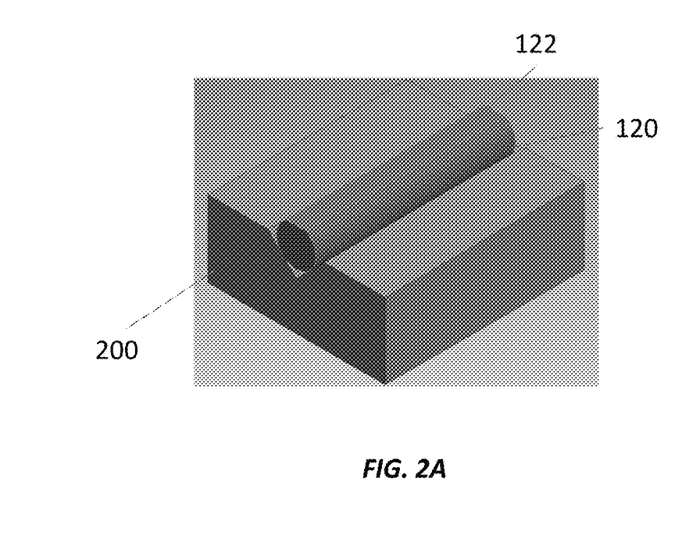
FIG. 2A shows a perspective view of a fiber laser endcap installed in a polished vee groove.

FIG. 2A shows a mechanical fixture—here, a polished vee groove 200—that can receive endcapped pigtails 100 with cylindrical endcaps 120. However, many varieties of endcap shapes and receiving mechanical fixtures could be envisioned and are within the scope of this disclosure, such as rectangular solids with square or rectangular cross sections, which could be received by a flat plate. A cylinder sits with a repeatable and highly accurate transverse position in a vee groove 200, assuming good form and surface quality of the cylinder and vee groove. Polishing or diamond turning of the vee groove 200 improves the mechanical repeatability of the vee groove 200 by improving its surface quality. Excellent form of the cylindrical endcap 120 can be achieved by drawing the endcap material from a precisely machined fused silica preform or by coring out the endcap using highly precise glass machining techniques, such as ultrasonic computer numeric control (CNC) milling.

Figure 2B:
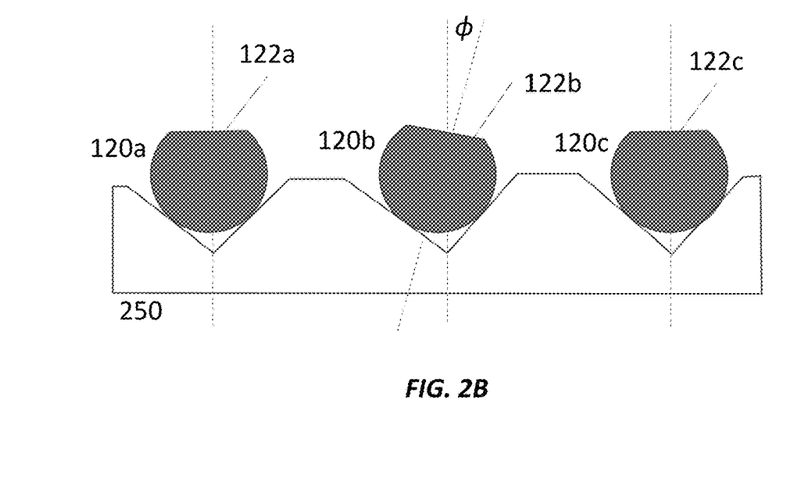
FIG. 2B shows an end-on view of endcaps in a one-dimensional vee-groove array.

FIG. 2B shows endcaps 120a-120c in a one-dimensional vee-groove array 250 for coherent beam combining or other applications. For coherent beam combining, the desired x-y (transverse to beam propagation) tolerance on the virtual waist positions 121 of the endcapped fibers 100 in the vee-groove array 250 is less than 1 micron relative to the locus of points defining the vee-groove array 250. Put differently, if any two endcapped fiber pigtails 100 are installed in the vee-groove array 250, their virtual waist positions 121 should not differ by more than 1 micron from their respective expected positions.

Manufacturing a large number of these endcapped fiber pigtails 100 and yielding out a binned set is an acceptable approach to producing a vee-groove array 250 populated with properly aligned endcapped fibers 100. Each endcap 120 has a flat surface 122 as shown in FIGS. 2A and 2B. This endcap facet 122 serves as a reference for the azimuthal orientation of the endcap 120 with respect to a mechanical fixture, such as the vee groove 200 in FIG. 2A or vee-groove array 250 in FIG. 2B.

The endcap facet 122 can be used to define a "clocking" angle, shown in FIG. 2B as the angle $\phi$ between the surface normal of the endcap facet 122 and the line that connects the center of the endcap 120 to the apex of the corresponding vee groove. The clocking angle can also be defined as the angle of rotation of the endcap 120 about the dashed line marked "physical center" 125 in FIG. 1. In FIG. 2B, the left endcap 120a and right endcap 120c are aligned properly to the vee-groove array 250 (they have clocking angles of zero), but the middle endcap 120b is misaligned as indicated by the non-zero clocking angle.

The clocking angle of the endcap can be measured when installing the endcap 120 in the vee groove 200 or vee-groove array 250, e.g., by bouncing a visible laser off the flat surface 122 of the endcap 120 or by having a mechanically stable imaging system measuring the flat orientation angle. Control of the clocking angle is more critical as the distance between the virtual waist position 121 and the center of azimuthal rotation increases, so this distance should be no more than 30 microns, as measured by the procedure outlined below.

Endcap Splicing

Referring again to FIG. 1, actively aligning the fiber 110 to the endcap 120 with laser light while imaging the laser beam waist with a camera compensates for the effect of the endcap polish angle 123 on the virtual waist position 121. The image of the laser beam waist is an image relay of the near field of the laser beam exiting the fiber 110, so this camera can be considered a "near-field" camera. Measurements of the beam position on the near-field camera determine the position of the laser beam waist with respect to the locus of points defining the vee groove array or other mechanical fixture that holds the endcap. The beam propagating through the fiber 110 should be aligned to a particular point in the plane of the near-field camera before splicing, and the splice should proceed with less than 1 micron of deviation in the virtual waist position 121 pre-to-post splice or less than 1 micron of deviation in the post-splice virtual waist position 121 part-to-part. The sub-micron pre-to-post splice deviation implies less than 1 micron deviation part-to-part assuming that the in-situ splicer metrology has zero drift. In practice, the in-situ splicer metrology may have some drift, and sub-micron pre-to-post splice deviation may be difficult to achieve in practice, hence the desire for sub-micron part-to-part deviation, which is more readily achievable and is useful for making arrays of properly aligned endcapped fibers.

Figure 3A:
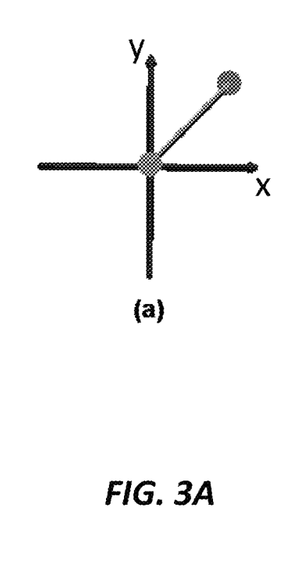
FIG. 3A shows pre-to-post splice deviation of the virtual waist position for a fiber laser endcap.

FIG. 3A shows pre-to-post splice deviation of the virtual waist position for a fiber laser endcap. The x and y axes are for the plane containing the virtual waist. The spot at the origin represents the starting pre-splice virtual waist position, and the spot in the first quadrant represents the post-splice virtual waist position. The line between the origin and the spot in the first quadrant represents the pre-to-post splice virtual waist position deviation. The scale is such that this deviation is typically 2-3 microns, and in an acceptable splice process is under about 10 microns.

Figure 3B:
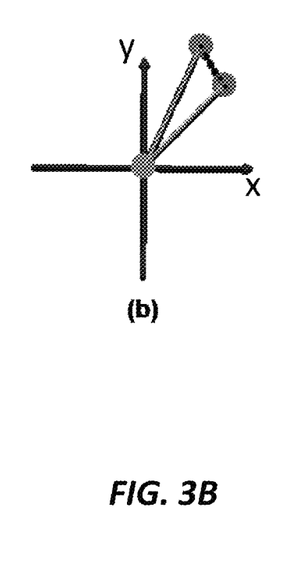
FIG. 3B shows part-to-part deviation of the post-splice virtual waist position for a fiber laser endcap.

FIG. 3B shows two different sets of pre-to-post splice virtual waist position deviations for a pair of endcapped fibers. Again, the x and y axes are of the plane containing the virtual waist. The dot at the origin represents the endcapped fibers' pre-splice virtual waist positions. The dots in the first quadrant represent the endcapped fibers' post-splice virtual waist positions. There is only one dot at the origin because it is assumed that both splices started at the same pre-splice position by design, but had different pre-to-post splice deviations, hence the two different dots in the first quadrant. The dashed line connecting the dots in the first quadrant represents the deviation between two fabricated parts (the part-to-part deviation).

The root-mean-square (rms) deviation between a set of fabricated parts (which would be represented by an array of dots all starting from the same dot at the origin) should be on the order of 1 micron or less. In the representation of FIGS. 3A and 3B, this is a two-dimensional (2D) rms deviation. For four points along a circle at angles of $0, \pi/2, \pi$, and $3\pi/2$, the circle should have a radius of 0.866 micron to have a 2D rms of 1 micron. For eight points spaced equally on a circle with a radius 0.9354 microns to have a 2D rms of 1 micron.

Figure 4:
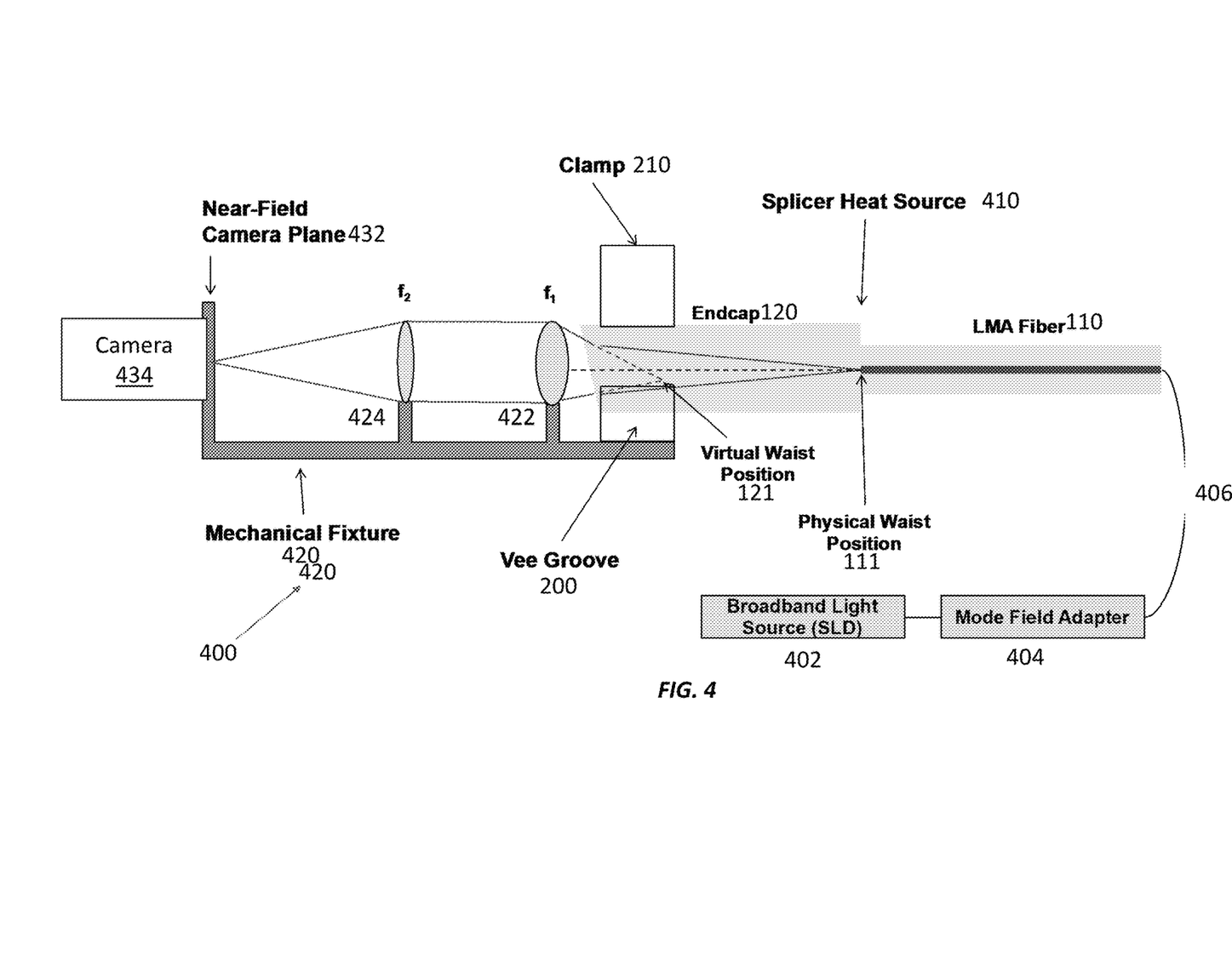
FIG. 4 shows an example setup for splicing a fiber laser endcap to an LMA fiber pigtail.

FIG. 4 shows an integrated near-field imaging and splicing setup 400 for achieving the desired pre-to-post splice and part-to-part deviations. A broadband source 402 (e.g., a source with a bandwidth of 10 nm or more), such as a superluminescent diode (SLD), launches a broadband beam into the LMA optical fiber pigtail 110 being spliced to the endcap 120 via a mode field adapter 404 and another optical fiber 406. Using a broadband source 402 like the SLD reduces or eliminates the effect of higher-order modes in the LMA fiber on the near-field beam position. The mode field adapter 404 adapts the single-mode fiber output of the SLD 402 to the LMA fiber 110 used in the fabrication.

In FIG. 4, the endcap 120 is held in a special splicing chuck that contains a vee groove 200 to hold the endcap 120 and a clamp 210 to ensure that the endcap 120 is mechanically registered in the vee groove 200. There is a mechanical stop (not shown) in the splicing chuck which sets the longitudinal position by of the endcap. A lid (e.g., the clamp 210 in FIG. 4 or a secondary lid on top of the clamp 210) can be used to rock the endcap 120 back and forth. A dowel pin between the endcap facet 122 (FIG. 2A) and the lid acts as a line contact to reduce potential misalignment between endcap facet 122 and the lid. The endcap's rotational position is set by jiggling the lid back and forth a few times, and then selecting a final "jiggle" position (either left or right) and always stopping the jiggle at the same position. The endcap's rotational position can also be set by imaging the facet 122 that is polished into the endcap 120.

A collimation lens 422 with focal length $f_1$, and a second lens 424 with focal length $f_2$ to focus the collimated light onto a camera 434 in a near-field plane 432. The second lens's focal length $f_2$ is generally chosen to be substantially longer than the focal length than the $f_1$ of the collimation lens 422 to magnify the beam position and size. This improves the accuracy of the positional measurements.

Once the endcap 120 is clamped in the vee groove 250, a fusion splicer (not shown) moves the fiber 110 until the deviation between the demagnified near-field virtual waist position as imaged by the near-field camera 434 and the desired (target) demagnified near-field virtual waist position is substantially less than 1 micron (e.g., within 100-200 nm of the desired position). Then a heat source 410 in the fusion splicer splices the fiber 110 to the endcap 120 to form the endcapped fiber 100.

In the setup of FIG. 4, the vee groove 200, collimation lens 422, second lens 424, and near-field camera 434 are held on a rigid mechanical fixture 420 made of material with a low coefficient of thermal expansion (CTE), such as Invar. The dimensional stability is most critical between the endcap 120 and collimation lens 422. The clocking angle of the endcap 120 should be repeatably set in the endcap splicing chuck before splicing. Put differently, the endcap 120 should be aligned rotationally about its optical axis before it is spliced to the fiber 110. The endcap 120 can be aligned rotationally by jiggling the fiber 110 back and forth and/or with the aid of a camera.

Reference Pigtails and Virtual Waist Centering

A reference endcapped pigtail with a virtual waist positioned as close to the center of azimuthal rotation of the endcap as possible (typically specified at <30 microns) can be used to make multiple pigtails with repeatable virtual waist positions and reduced sensitivity to clocking angle. The reference endcapped pigtail should be placed in the splicing setup (e.g., the setup 400 shown in FIG. 4) at the beginning of each pigtail fabrication session, to set the reference target position for splicing. The proximity of the reference endcapped pigtail's virtual waist position to the reference endcap's center of rotation can be characterized by rotating the reference endcap in the vee groove while monitoring the precession of the beam on the near-field camera. This deviation affects the reference endcapped pigtail's sensitivity to clocking and should be as small as possible. Once the reference endcapped pigtail has been fabricated, it can be used to make similarly centered endcapped pigtails.

Endcap Qualification Station (EQS)

The splicing process generates significant amounts of heat and may distort the endcap splicing chuck over time. This effect can be corrected using the reference endcapped pigtail(s) as described above. However, measurements of the post-splice position of the beam on the near-field camera may also be affected for significant amounts of time after the splice is done due to residual thermal energy storage in the materials in the splicing chuck itself. For this reason, final measurements of the virtual waist positions with respect to the locus of points defining the vee groove should be performed on a separate setup known as an endcap qualification station (EQS).

Figure 5A:
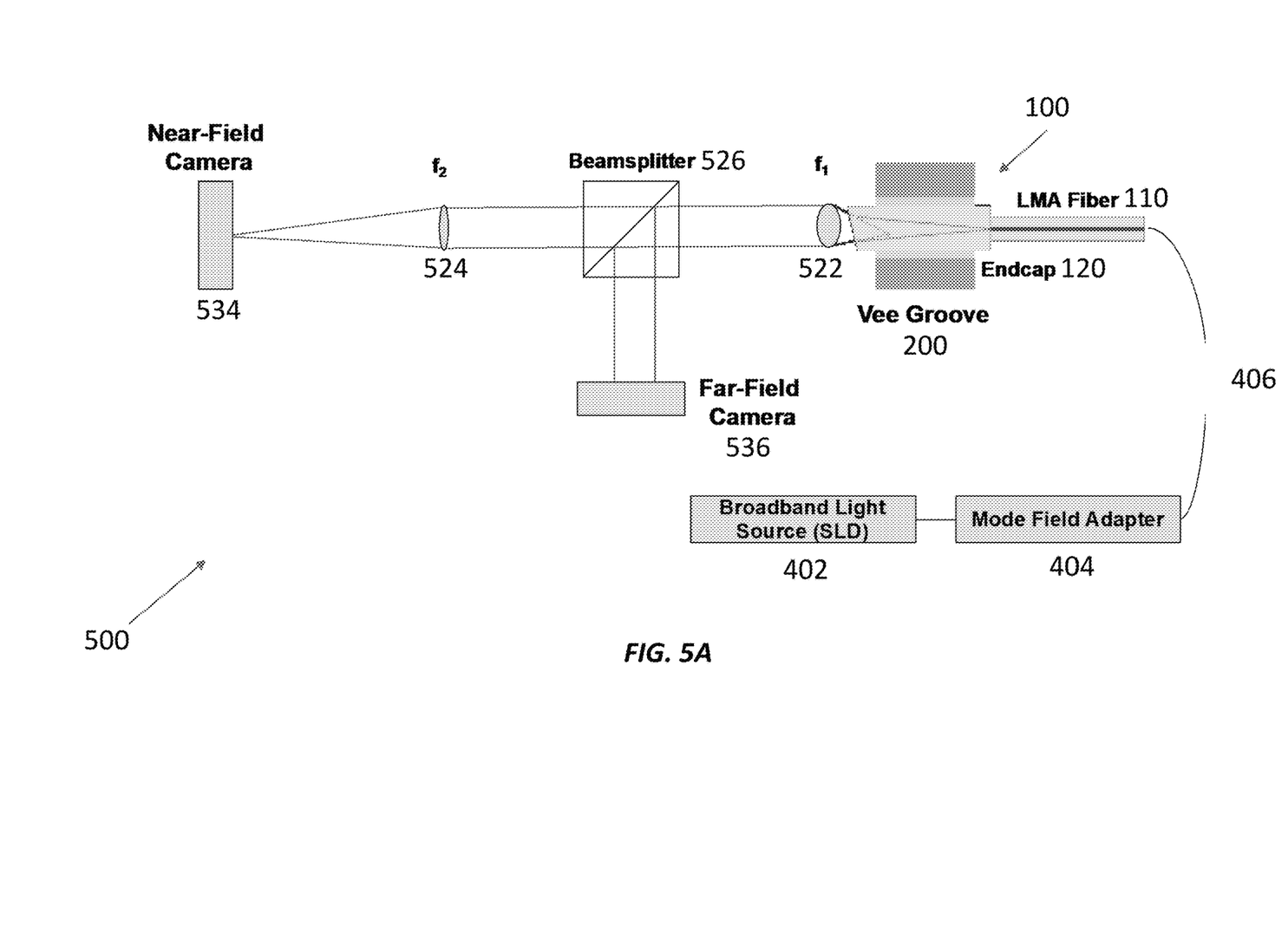
FIG. 5A shows a top view of an Endcap Qualification Station (EQS) for measuring the virtual waist position of a fiber laser endcap spliced to a fiber.
Figure 5B:
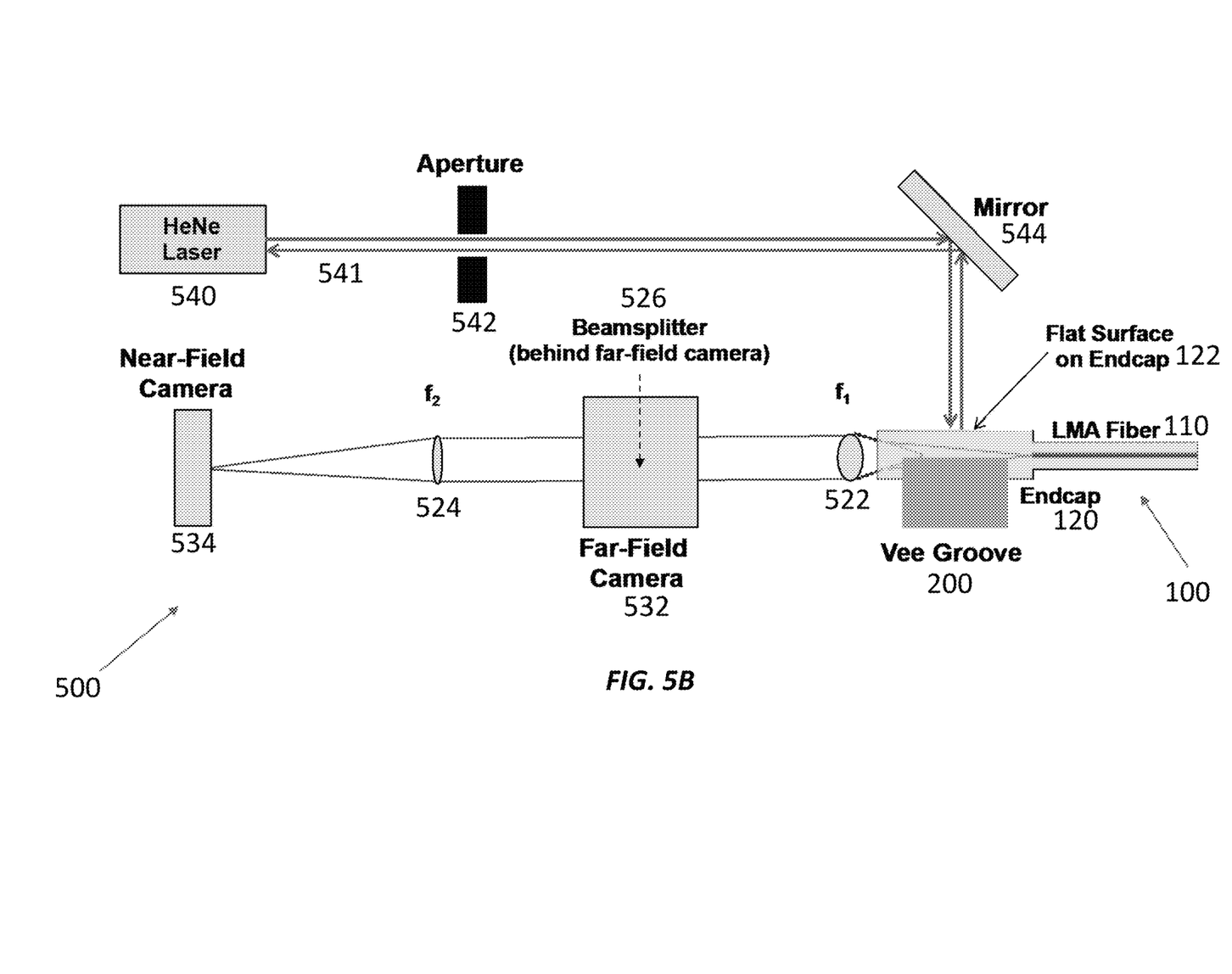
FIG. 5B shows a side view of the EQS of FIG. 5A.

FIGS. 5A and 5B show top and side views, respectively, of an optical layout of the EQS 500 with an endcapped fiber pigtail 100 under measurement. As shown in FIG. 5A, the EQS 500 includes a vee groove 200 mechanically identical to that used in the splicing chuck, again with a collimation lens 522 and a focusing lens 524 with focal lengths $f_1$ and $f_2$, respectively, and a near-field camera 534. Again, the endcapped fiber pigtail 100 projects light from a broadband light source 402 onto the near-field camera 534, which is in the focal plane of the focusing lens 524 and provides position data. The EQS 500 also includes a far-field camera 536 in collimated space (in FIG. 5A, the far-field camera 536 is in optical communication with the collimation lens 522 via a beam splitter 526) to measure the far-field pointing angle of the beam exiting the endcapped fiber pigtail 100.

FIG. 5B shows a side view of the EQS 500 used for setting the clocking angle of the endcap 120 prior to measurement. In FIG. 5B, a laser beam 541 from a HeNe laser 540 is aligned through an aperture 542 and directed via a mirror 544 onto the flat 122 polished into the endcap 120, which has been coarsely oriented in the vee groove 200. By azimuthally rotating the endcap 120, the HeNe beam's reflection off of the endcap 120 can be directed back on itself until it passes through the aperture 542. The aperture 542 thus serves as the reference for the endcap clocking angle. Increasing distance between the aperture 542 and the flat 122 polished into the endcap 120 increases the accuracy of the clocking alignment.

After initial setup of the EQS 500, a new user should practice and demonstrate the ability to place the endcap 120 in the vee groove 200 multiple times and demonstrate substantially better than 1 micron repeatability in the virtual waist position as calculated from demagnified near-field camera data. The vee groove 200 can be designed with a vacuum port that can be connected to a vacuum pump which assists in repeatable placement. Even with the vacuum port, stresses in the LMA fiber 110 can influence the near-field position. These stresses can be reduced or eliminated by reducing stress and strain on the LMA fiber 110 extending from the vee groove 200, e.g., by laying the LMA fiber 110 on a table or other surface at even height with the vee groove 200.

The accurate placement of the endcap 120 and the reduction or elimination of the effect of fiber stress can be confirmed by repeatably turning the vacuum on and off while monitoring the near-field beam position. If the near-field image does not change when the vacuum is turned on and off, then the endcap 120 and fiber 110 are placed such that is little to no stress on the fiber. If the near-field image changes when the vacuum is turned on and off, the stresses in the fiber 110 can be reduced until there is no discernable difference in the near-field position when the vacuum is switched on and off. This level of repeatability also depends on the ability to focus the broadband beam emitted through the endcapped fiber pigtail 100 onto the near-field camera repeatably. Put differently, it depends on the ability to repeatably position the endcap 120 in the direction of propagation. To ensure accurate focus, a user can translate the broadband beam emitted by the endcapped fiber pigtail 100 through the focus (e.g., with a translation stage that moves the endcap 120 relative to the near-field camera 534) while watching a live display of the beam diameter on a display or beam profilometer. By monitoring the beam diameter vs. time on a "strip recorder" type interface, the human eye can more accurately home in on the desired focusing position.

The same reference pigtail used in the splicer near-field imaging should be measured in the EQS 500 at the beginning of each pigtail fabrication session to set the position that all EQS measurements for the session can be referenced to, for both the near-field EQS camera 534 and far-field EQS camera 536. This reduces or eliminates effects of long-term drift of the EQS.

For efficient operation, light emitted by a completed, spliced endcapped fiber 100 should be measured on the EQS 500 before the endcapped fiber 100 is clipped off of the fiber spool and packaged for storage and eventual usage in the intended application. This implies usage of LMA fiber spools of significant length (e.g., >100 m) for efficient production of a large number of pigtails.

EQS Data Collection

For each pigtail measured in the EQS 500, the following data can be recorded:

Serial number of the spliced endcap;
Personnel name(s) performing splicing and EQS measurements;
Splicer near-field reference position (X,Y) and time/date reference position was recorded (there is no far-field camera for the splicer);
EQS near-field and far-field reference position (X,Y) and time/date reference position was recorded;
Splicer near-field targeted position (pre-splice) and achieved splice near-field position (post-splice) (the splicer targeted position should be as close to the splicer reference position as possible, but these positions may not be equal due to limitations in motor resolution); and
EQS near-field and far-field positions.

Figure 6A:
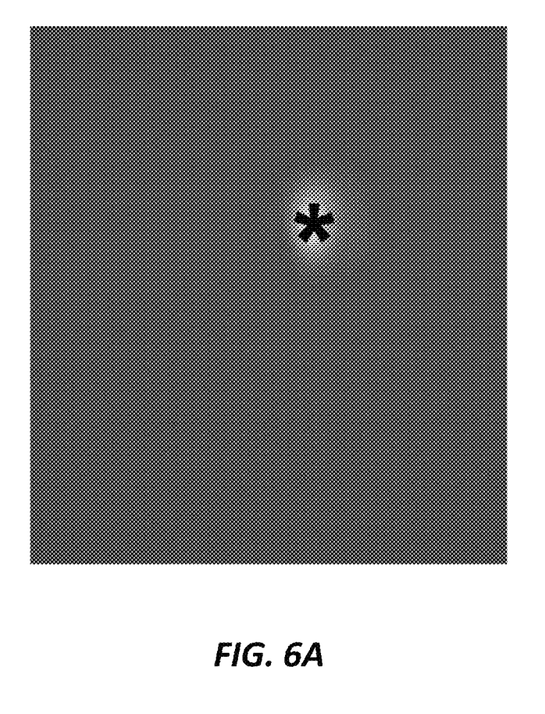
FIG. 6A shows a pre-splice beam image with an asterisk indicating the location of the peak of a Gaussian fit to the beam shape.
Figure 6B:
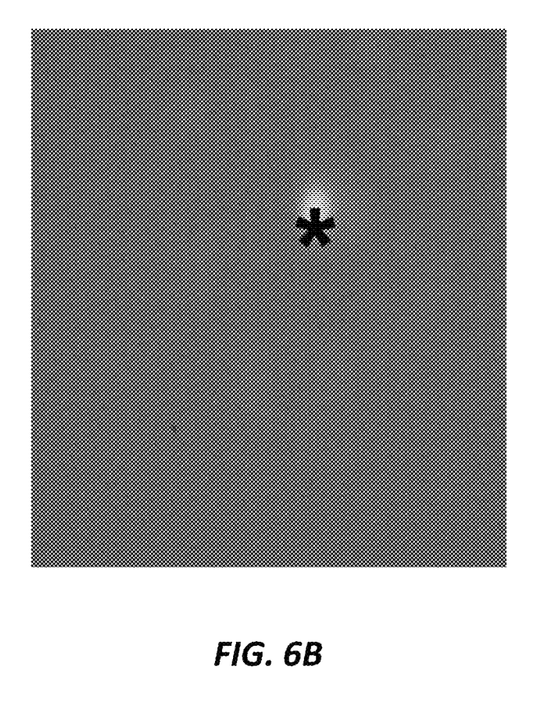
FIG. 6B shows a post-splice beam image with an asterisk indicating the location of the peak of a Gaussian fit to the pre-splice beam shape

FIGS. 6A and 6B show images of actual pre-splice and post-splice near-field beam, respectively. The asterisk in each figure indicates the position of the peak of a 2D Gaussian fit to the pre-splice beam shape. In FIG. 6A, the asterisk nearly covers the beam. In FIG. 6B, the asterisk is offset slightly from the beam, indicating that the pre- and post-splice beams (and hence the pre- and post-splice virtual waist positions) are slightly different. This difference could be due limits on the actuator(s) in the splicer that move the fiber relative to the endcap before splicing occurs.

Pigtail Packaging

The pigtails can be attached with tape to cleanroom folders and serialized with a label near the midpoint of the length of the LMA fiber, with additional labeling on the cleanroom folder. These packaged endcapped pigtails can be kept in a clean container until ready for use or shipment.

Figure 7:
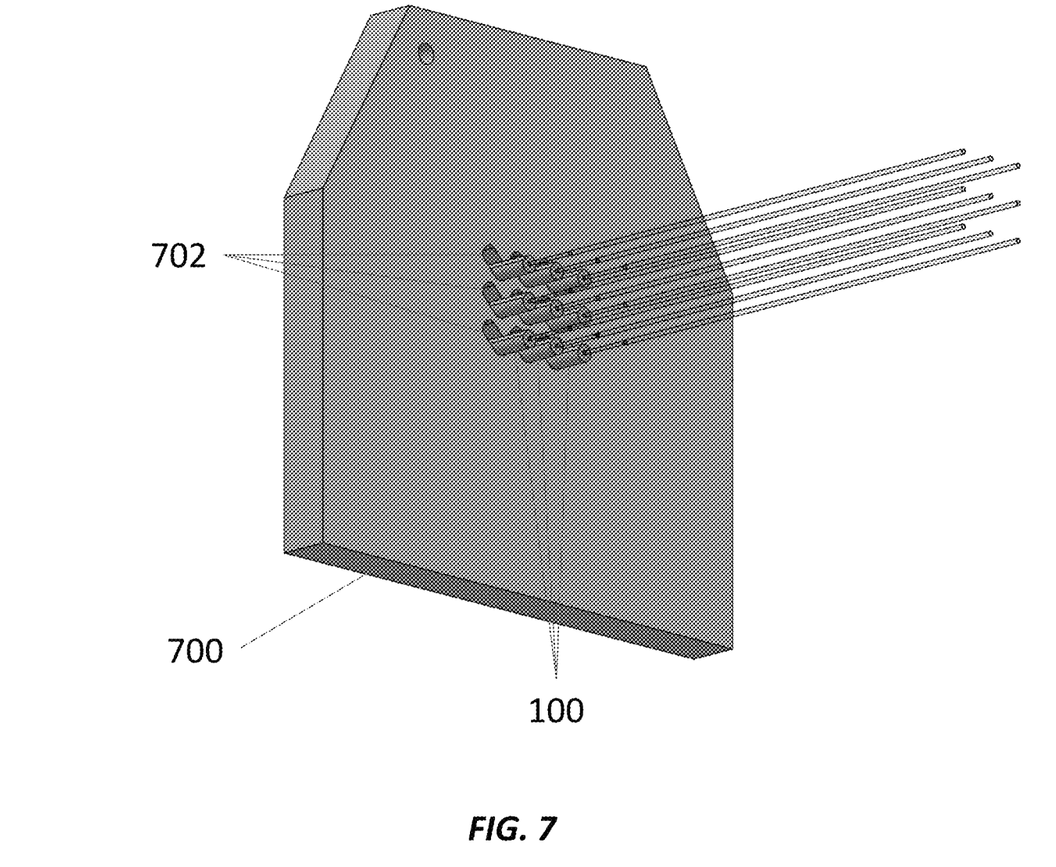
FIG. 7 shows endcapped fibers in a vee groove array.

FIG. 7 is a drawing of a vee groove array 700 with properly aligned endcapped pigtails 100. The pigtails 100 are matched to vee grooves 702 in the vee groove array 700 based on the virtual waist positions measured with the EQS. Each pigtail 100 is placed in the corresponding vee groove 702, which may have a mechanical stop (not shown) that sets the pigtail's longitudinal position, then rotated until it is aligned properly with respect to the vee groove 702. The pigtail's rotational position can be set by the mechanical stop as well.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method of making an endcapped fiber, the method comprising:
   aligning an optical fiber to an endcap;
   transmitting light through the optical fiber and the endcap;
   focusing the light emitted by the endcap to a near-field plane;
   measuring an intensity distribution of the light in the near-field plane;
   adjusting the alignment of the optical fiber with respect to the endcap based on the intensity distribution; and
   splicing the optical fiber to the endcap after adjusting the alignment to form the endcapped fiber,
   wherein measuring the intensity distribution of the light in the near-field plane comprises comparing the intensity distribution to a reference intensity distribution.

2. The method of claim 1, wherein aligning the optical fiber to the endcap comprises registering the endcap to a vee groove.

3. The method of claim 1, wherein transmitting light through the optical fiber and the endcap comprises launching a beam having a bandwidth of at least 10 nm into the optical fiber.

4. The method of claim 1, wherein adjusting the alignment of the optical fiber with respect to the endcap comprises translating the optical fiber with respect to the endcap in a direction orthogonal to an optical axis of the optical fiber.

5. The method of claim 1, wherein adjusting the alignment of the optical fiber with respect to the endcap comprises placing a virtual waist of the endcapped fiber to within 200 nanometers of a desired position of the virtual waist.

6. The method of claim 1, further comprising:
   placing the endcapped fiber in a vee groove array; and
   aligning the endcapped fiber with respect to another endcapped fiber in the vee groove array.

7. The method of claim 6, where in aligning the endcapped fiber with respect to the other endcapped fiber in the vee groove array comprises rotating the endcapped fiber until a virtual waist position of the endcapped fiber is aligned to a virtual waist position of the other endcapped fiber.

8. The method of claim 6, further comprising:
   detecting a break in the endcapped fiber in the vee groove array; and
   replacing the endcapped fiber in the vee groove array with another endcapped fiber.

9. The method of claim 1, further comprising:
   measuring a near-field intensity distribution of light emitted from the endcapped fiber; and
   comparing the near-field intensity distribution to a reference near-field intensity distribution.

10. The method of claim 1, further comprising:
    measuring a far-field intensity distribution of light emitted from the endcapped fiber; and
    comparing the far-field intensity distribution to a reference far-field intensity distribution.

11. An endcapped fiber made according to the method of claim 1.

12. A method of making an endcapped fiber from an optical fiber and an end cap, the method comprising:
    aligning the optical fiber to the endcap;
    measuring a near-field intensity distribution of light transmitted through the optical fiber and the endcap;
    adjusting a position of a virtual waist of the endcap and the optical fiber based on the near-field intensity distribution;
    splicing the optical fiber to the endcap after adjusting the position of the virtual waist to form the endcapped fiber;
    measuring a near-field intensity distribution of light emitted from the endcapped fiber; and
    comparing the near-field intensity distribution to a reference near-field intensity distribution.

13. The method of claim 12, further comprising:
    measuring a far-field intensity distribution of light emitted from the endcapped fiber; and
    comparing the far-field intensity distribution to a reference far-field intensity distribution.

14. The method of claim 12, wherein the endcap is a first endcap, the optical fiber is a first optical fiber, and the endcapped fiber is a first endcapped fiber, and further comprising:

aligning a second optical fiber to a second endcap;

measuring a near-field intensity distribution of light transmitted through the second optical fiber and the second endcap;

adjusting a position of a virtual waist of the second endcap and the second optical fiber based on the near-field intensity distribution of light transmitted through the second optical fiber and the second endcap;

splicing the second optical fiber to the second endcap after adjusting the position of the virtual waist to form a second endcapped fiber;

measuring a near-field intensity distribution of light emitted from the second endcapped fiber; and comparing the near-field intensity distribution of light emitted from the second endcapped fiber to a reference near-field intensity distribution.

15. A method of making an endcapped fiber, the method comprising:

aligning an optical fiber to an endcap;

transmitting light through the optical fiber and the endcap;

focusing the light emitted by the endcap to a near-field plane;

measuring an intensity distribution of the light in the near-field plane;

adjusting the alignment of the optical fiber with respect to the endcap based on the intensity distribution;

splicing the optical fiber to the endcap after adjusting the alignment to form the endcapped fiber;

placing the endcapped fiber in a vee groove array; and aligning the endcapped fiber with respect to another endcapped fiber in the vee groove array.

16. The method of claim 15, wherein adjusting the alignment of the optical fiber with respect to the endcap comprises placing a virtual waist of the endcapped fiber to within 200 nanometers of a desired position of the virtual waist.

17. The method of claim 15, wherein aligning the endcapped fiber with respect to the other endcapped fiber in the vee groove array comprises rotating the endcapped fiber until a virtual waist position of the endcapped fiber is aligned to a virtual waist position of the other endcapped fiber.

18. The method of claim 15, further comprising:

detecting a break in the endcapped fiber in the vee groove array; and replacing the endcapped fiber in the vee groove array with another endcapped fiber.

19. The method of claim 15, further comprising:

measuring a near-field intensity distribution of light emitted from the endcapped fiber; and comparing the near-field intensity distribution to a reference near-field intensity distribution.

20. The method of claim 15, further comprising:

measuring a far-field intensity distribution of light emitted from the endcapped fiber; and comparing the far-field intensity distribution to a reference far-field intensity distribution.

* * * * *